April 15, 1958    B. B. BURCKHALTER    2,830,563
AUTOMATIC JACK LEG

Filed March 26, 1954      3 Sheets-Sheet 1

Fig. II

Burton B. Burckhalter
INVENTOR.

April 15, 1958
B. B. BURCKHALTER
2,830,563
AUTOMATIC JACK LEG
Filed March 26, 1954
3 Sheets-Sheet 2
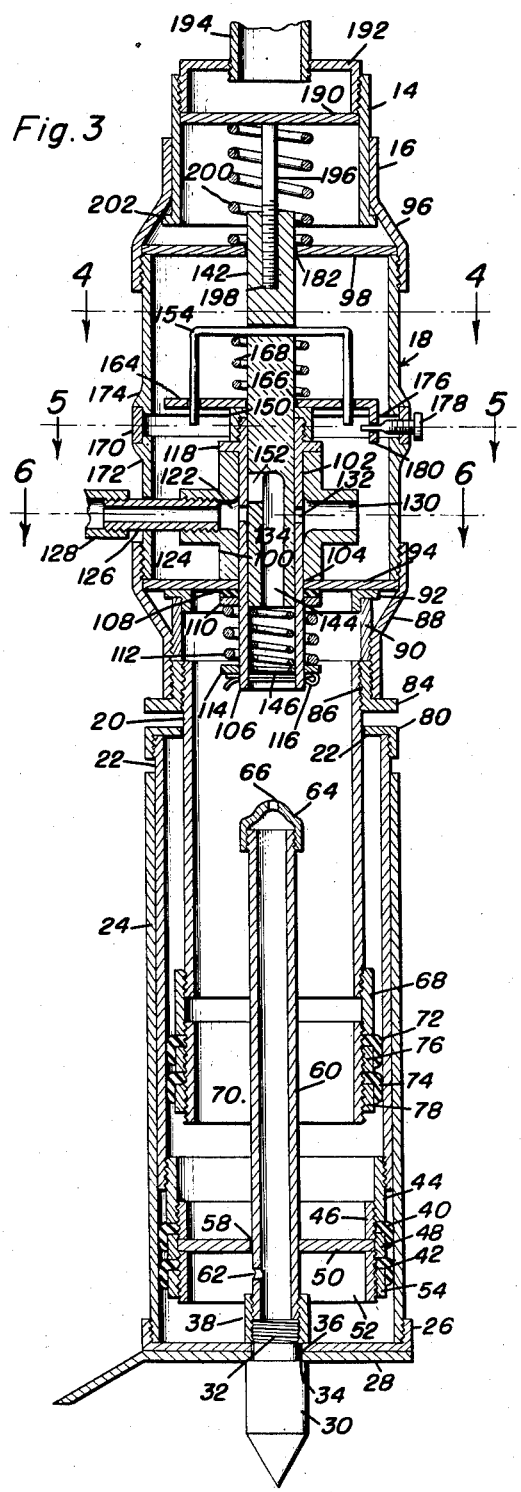
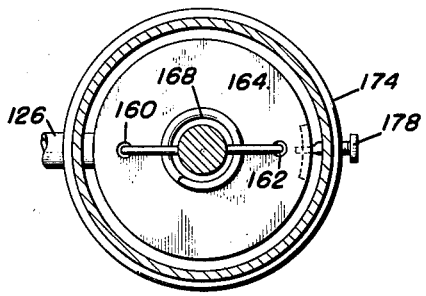
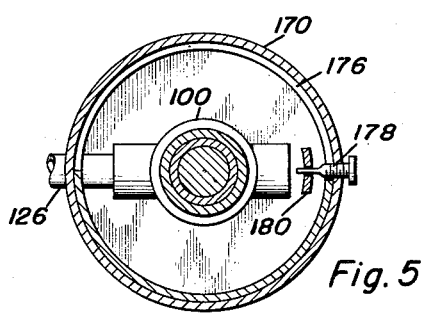
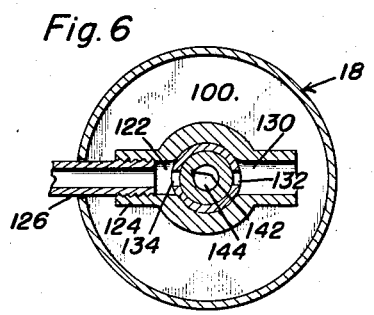
Burton B. Burckhalter
INVENTOR.

April 15, 1958  B. B. BURCKHALTER  2,830,563
AUTOMATIC JACK LEG
Filed March 26, 1954  3 Sheets-Sheet 3
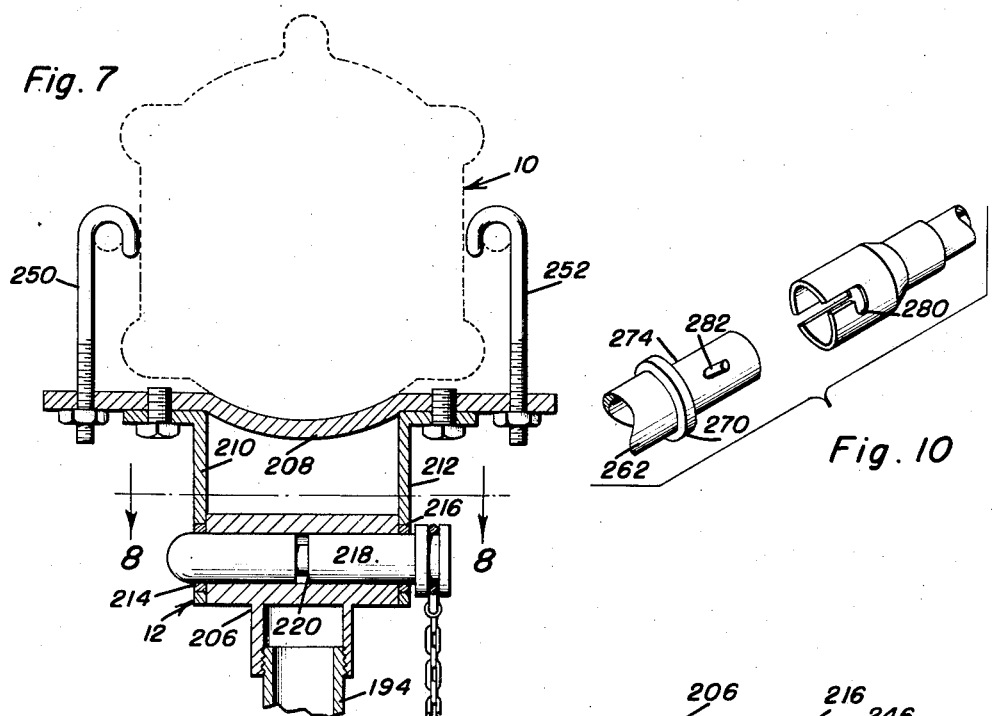
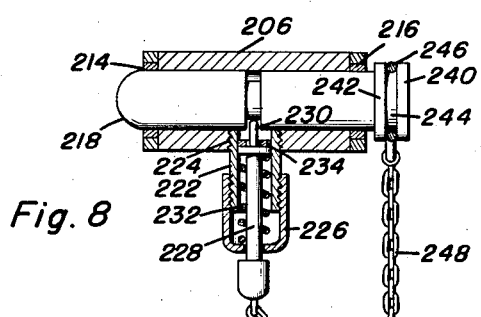
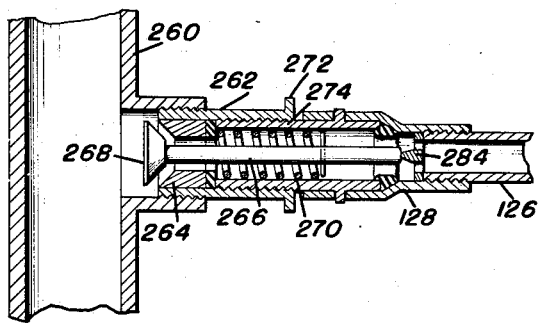
Burton B. Burckhalter
INVENTOR.
BY *Clarence A. O'Brien*
*and Harvey B. Jackson*
Attorneys United States Patent Office 2,830,563
Patented Apr. 15, 1958

2,830,563

AUTOMATIC JACK LEG

Burton B. Burckhalter, Clifton, Colo.

Application March 26, 1954, Serial No. 419,026

9 Claims. (Cl. 121—46)

This invention relates to an automatic jack leg, and particularly to a device for automatically supporting a jackhammer at a predetermined height or to provide a predetermined pressure thereto.

In the operation of jackhammers it is desirable to have a means for supporting the jackhammer at a predetermined height or at an adjustable height at the will of the operator. Since the jackhammer must frequently be coupled and then uncoupled from the jack leg, it is desirable to provide quick acting couplings for both the hose connection and the jackhammer support so that the jackhammer or its connections may be readily changed at will and preferably the connection to the fluid pressure line is made so that it may be not only rapidly disconnected but so that it is automatically closed when disconnected.

Since the jack leg must operate over considerable ranges and it is desirable to make as compact a unit as possible, the jack proper is constructed as a plurality of telescoping cylinders which will telescope one within the other and has an automatic pressure regulated valve to control the operation thereof together with a manual valve for opening or closing the valve or for regulating the heighth at which it is operated.

Accordingly it is an object of the invention to provide an improved jack leg.

It is a further object of the invention to provide a jack leg which will fold into small dimensions or open to a relatively long dimension.

A still further object of the invention is to provide an automatic control valve for a jack leg.

It is a further object of the invention to provide a jack leg having a jack hammer support which is readily connected or disconnected therefrom.

It is a further object of the invention to provide a fluid conduit which may be readily connected or disconnected and which will be closed when disconnected.

Other objects and many of the attendant advantages of the present invention will be apparent from the following detailed description taken in conjunction with the accompanying drawings in which:

Figure 3 is a vertical elevation through the jack leg and the control chest therefor with the jack leg in folded condition;

Figure 4 is a cross section through the control chest, taken substantially on the plane indicated by the section line 4—4 of Figure 3;

Figure 5 is a cross section through the manual control device of the control valve, taken substantially on the section line 5—5 of Figure 3;

Figure 6 is a cross section through the valve proper, taken substantially on the plane indicated by the section line 6—6 of Figure 3;

Figure 7 is a vertical section through the quick connecting wrist pin bearing for supporting the weight carrying cradle in operative relation to the valve;

Figure 8 is a section taken substantially on the section line 8—8 of Figure 7 and showing the locking device for retaining the wrist pin bearing in position;

Figure 9 is a sectional elevation through the quick coupling air line disc connect;

Figure 10 is an exploded perspective of the coupling portions of the connector; and Figure 11 is an exploded perspective of the valve elements.

Figure 1:
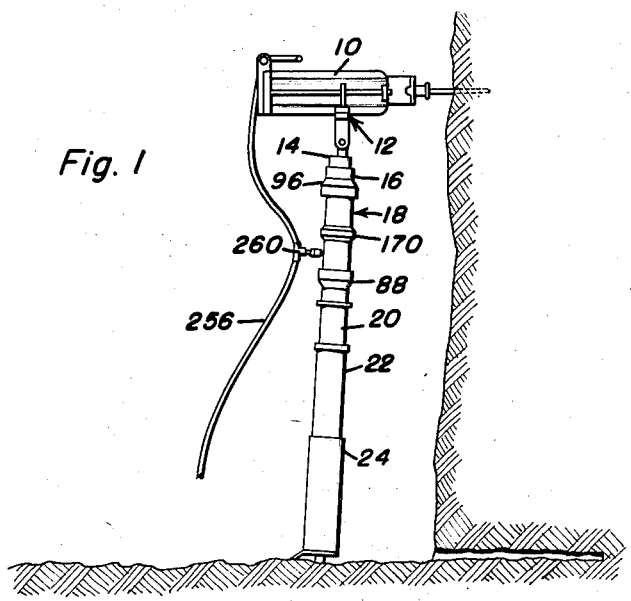
Figure 1 is an elevation of the jack leg, holding a jackhammer in position.
Figure 2:
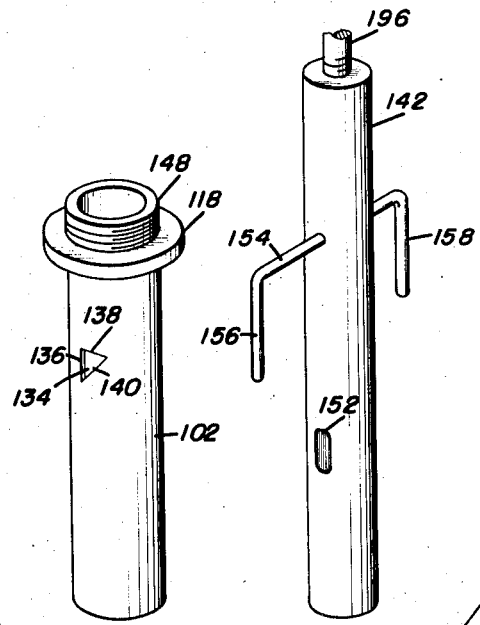
Figure 2 is an enlarged elevation of the telescoping jack portion in extended position.
Figure 2:
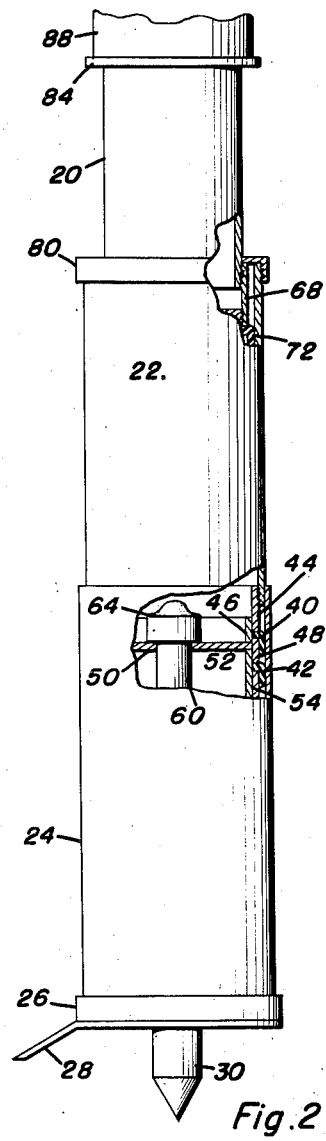

In the exemplary embodiment according to the invention, a jackhammer 10 is mounted on a saddle 12 which is supported on a sliding sleeve 14 held in a guide 16 mounted on the top of a valve control chest 18 which in turn is mounted on the top of an inner cylinder 20 of a plurality of cylinders such as 22 terminating in an outer cylinder such as 24.

In the construction according to the device, the plurality of cylinders such as 20, 22, and 24, provide the extensible jack leg, while the chamber 18 and the valve mechanism control therein, together with the sliding sleeve 14 and the weight supported thereby provides an automatic control for maintaining the pressure in the extensible cylinders.

In the construction of the extensible jack leg per se the outside cylinder, such as the cylinder 24 is provided with a closing head 26 which is connected in fluid tight relation to one of the ends of the cylinder such as the bottom end. A suitable plate 28 is preferably mounted on the closure head 26 and it will be retained by means of a contact pin 30 which has a base portion 32 which extends through apertures 34 and 36 in the plate 28 and the head 26, respectively, and closes into a collar 38 which will be mounted inside of the cylinder 24.

The intermediate cylinder 22 will be slidably received in the outer cylinder 24 and sealing rings 40 and 42 will be placed on an enclosure member comprising a first sleeve 44 in which is placed an inner sleeve 46, preferably the sleeve 44 being threadedly received on the inner end of the bottom of the intermediate cylinder 22.

The sleeve 46 is then threadedly engaged within the sleeve 44 and the sealing cup 40 will be placed on the member 44 against the bottom of the sleeve 44. A spacer member 48 will then be threadedly engaged with the sleeve 46 and tightly engage the cup 40 to retain it in position on the end of the cylinder 22. A cross head 50 will then be placed within the spacer 48 and secured by means of a terminal sleeve 52. The sealing cup 42 will be placed on the terminal member 52 and retained by means of a retainer ring 54. The retaining ring 54 being threadedly engaged on the outer surface of the terminal ring 52.

The cross head 50 will be provided with an aperture 58 through which extends a longitudinal control pin 60 which will have the lower end threaded into the collar 48 and preferably will be constructed as a tubular member having an aperture 62 adjacent the lower end thereof and below the cross head 50. A stop member 64 in the form of a cap will be threadedly engaged on the top end of the tubular member 60 and preferably will be provided with an aperture 66 so that fluids from the inner cylinders may readily flow into the outer cylinder 24. The inner cylinder 20 will be provided with an outwardly extending terminal member 68 and an inner terminal member 70. Sealing cups 72 and 74 will be placed on the outer extremity 70 with a spacer member 76 retaining the cup 72 against the outer member 68 and a spacer member 78 retaining the cup 74 in position.

The intermediate cylinder 22 will be provided with a cap-like guide member 80 provided with an inner aperture 82 which guidingly engages the outer surface of the cylinder 20 so that it provides a guide for the extension of the cylinder and a stop member to contact the member 68 to prevent lateral disengagement of the cylinders when extended.

The end of the inner cylinder 20 opposite to the cap 26 is provided with an angular flared cap 84 which is threadedly engaged on the outer surface of the inner cylinder 20 as at 86 and an outwardly flaring cap member 88 is threadedly engaged with the outer surface of the angle cap member 84. A terminal collar 90 is threadedly engaged with the inner portion of the smaller portion of the flared member 88 and a gasket 92 is placed on the top of the member 90 and a sealing plate 94 is placed thereon. The lower end of the valve chest 18 is provided with a threaded engagement with the upper end of the flared portion 88 and screws rigidly against the sealing plate 94 to maintain it in sealing relation with the member 90.

The upper end of the valve chest 18 is provided with a reduced cap 96 which terminates in the guide 16. The cap 96 retains a guide plate 98 firmly on the top of the chest 18.

A valve body 100 is positioned within the chest 18 and is provided with a longitudinal bore 102 which extends therethrough and the plate 94 is provided with an aperture 104 substantially of the same size as the bore 102 and a sleeve 106 extends through the bore 102 and the aperture 106 to retain the body 100 within the valve chest. A sealing gasket 108 and a sealing washer 110 is retained in sealing relation between the sleeve 106 and the aperture 104 by means of a spring 112, spring 112 being retained by a washer 114 which is in turn retained by means of a cotter key 116 extended through suitable apertures in the lower end of the sleeve 102. Sleeve 102 being provided with a collar 118 which overlies the top of the body 100 so that the spring 112 maintains the entire device in properly positioned and fluid sealed relation.

The body 100 is provided with an inlet passage 122 about which is a boss 124 into which is threadedly engaged a conduit 126 which in turn connects to a coupler 128.

The body 100 is also provided with an outlet passage 130. The sleeve 102 is provided with an exhaust port 132 and an inlet port 134 which communicates with the inlet pasage 122.

The port 134 is preferably constructed of triangular formation having a vertical side 136 extending along a generatrix of the cylindrical surface of sleeve 102 with a horizontal top 138 and an oblique side 140. This formation will cooperate with a valve rod presently to be described.

The valve rod 142 is rotatably and slidably received in the sleeve 102 and is provided with a longitudinal bore 144 which is open at the lower end thereof to communicate with the interior of the cylinders of the jack leg proper. A spring 146 is mounted within the end of the sleeve 102 and presses against the end of the valve rod 142 to move the valve rod upwardly therein. The top of the sleeve 102 is provided with a threaded extension 148 on which is mounted a packing gland 150 to provide a fluid type seal between the valve rod 142 and the sleeve 102.

The lateral opening 152 communicates the longitudinal bore 144 with the inlet passage 122 and preferably the opening 152 is elongated and cooperates with the port 134 in a varying manner.

The upper end of the valve rod 142 is provided with a transverse control pin 154 which has depending arms 156 and 158 which extend through apertures 160 and 162 in a control plate 164. The control plate 164 is provided with an aperture 166 to receive the rod 142 and rests on the top of the gland 150. The spring 168 is interposed between the plate 164 and the pin 154 for maintaining the same in separated relation. The spring 168 serves a double function of maintaining the plate 164 seated on the gland 150 and of biasing the valve rod 142 to its upward position in the sleeve 102.

The control for the plate 164 comprises an annular collar 170 mounted in a groove on the exterior of the chest 118 and controlled by means of lips 172 and 174. A slot 176 is provided in the chest 18 under the collar 170 and a connector 178 extends through the collar 170 and engages a downturned flange 180 on the plate 164. As shown, the ports 132 and 134 are diametrically opposite each other so that the slot 176 extends 180 degrees. Obviously, however, the apertures 132 and 134 may be arranged at any suitable angle in which case the slot 176 would be of less length.

The top end of the valve rod 142 extends through a guide aperture 182 in the plate 98.

The automatic control mechanism includes the member 14 slidable in the guideway 16 and is provided with a cross head 190 which will be positioned by means of a control cup member 192 which is threadedly engaged in the top of the sleeve 14. A suitable coupling 194 is threadedly engaged in the cup member 192 for supporting the cradle presently to be described. The pin 196 is adjustably received in the top of the rod 142 preferably by means of threaded connections 198. A spring 200 is mounted on the plate 98 and against the cross head 190 so that the sleeve 14 is constantly urged to extended position and the springs 146 and 168 will maintain the rod 142 in extended position so that the pin 196 will be constantly against the cross head 190.

The sleeve 14 is provided with a stop member 202 which will engage the cap 96 to prevent undue extension of the sleeve 14 and will also engage the cross member 98 to prevent undue longitudinal motion of the device.

The weight receiving detachable member 12 comprises a wrist bearing 206 which is threadedly engaged on the top of the member 194. A cradle member 208 is provided with downturned ears 210 and 212. The ears 210 and 212 are provided with bearings 214 and 216 and the ears 210 and 212 are positioned to engage the ends of the wrist bearing 206. A bearing pin or wrist pin 218 is adapted to extend through the bearings 206.

In order to provide for quick detachability of the cradle 208 from the wrist bearing 206, the pin 218 is readily slidable through the wrist bearing and the bearings 214 and 216, and a latching groove 220 is provided intermediate the ends of the bearing pin 218. A latching housing 222 is threadedly connected into an aperture 224 in the side of the wrist bearing 206 and a housing 226 is threadedly connected to the housing 222. A sliding pin 228 having a terminal 230 is received in the housing and pressed toward the interior of the wrist bearing 206 by a spring 232. A stop member 234 prevents excessive forward movement of the pin 230.

In order to prevent the loss of the bearing pin 218, a pair of collars 240 and 242 are provided thereon to provide a ring receiving groove 244 in which will be received a ring 246 which will be secured to the pin 228 by suitable means such as a chain 248.

A pair of J-bolts 250 and 252 will be provided in the cradle member 208 for connecting to the jackhammer 10 in any suitable manner.

A fluid conduit 256 will be connected to the jackhammer 10 for supplying the suitable operating fluid thereto. In order to supply fluid to the jack leg when the jack is being operated, a coupling 260 is placed in the conduit 256 for connection with the conduit 126 of the valve body 100. A quick acting coupler provides a valve tube 262 screwed into the coupler 260 and having a valve seat 264 therein. A valve stem 266 extends through an aperture of the seat 264 and is provided with a valve head 268 which will be seated in the valve seat 264 by means of a spring 270. The tube 262 is provided with an end collar 272 and a coupling sleeve 274 will be threadedly engaged therein. The conduit 126 is provided with a bell-like extension 128 which will be provided with bayonet slots 280 for engagement with the bayonet pins 282 of the member 274. A bridge member 284 is provided on the end of the member 126 for engaging the end of the rod 266 so that when the bayonet connection is made, the bridge member 284 will lift the valve 268 off of the seat 264 and couple the fluid in the line 256 into the valve body 100.

To operate the device according to the invention, the jackhammer will be mounted on the cradle 208 and preferably rigidly secured thereto after which the cradle will be placed on the wrist bearing 206 and the quick coupler connected to the conduit 126. The valve rod 142 will then be turned by means of the control collar 170 so that the side opening 152 will be in register with the inlet port 134 and the weight placed on the cradle will depress the springs 200 and 146 so that the opening 152 will be in alignment with the port 134 and fluid will flow into the telescoping cylinders to cause extension thereof. When the pressure in the cylinders plus the bias exerted by the springs 146 and 168 are sufficiently great, the sleeve 14 will slide outwardly and the opening 152 will slide upwardly so as to be out of alignment with the port 134 and consequently less fluid will flow through the misaligning ports. Obviously by turning the collar 170 the size of the opening 134 available for the elongated opening 152 may be decreased at will and obviously by turning it far enough, the opening will be completely closed so that no fluid may either enter or leave the cylinders. Obviously, as the weight increases or the pressure diminishes the opening will open and close as may be desired to maintain the jackhammer in the desired position. When it is desired to collapse the jack leg the collar 170 is turned to communicate the lateral opening 152 with the outlet port 132 so that the fluid may readily escape from the telescoping cylinders which will then return to their normal position. Obviously the hammer may be readily removed or reinserted as often as may be desired by simply pulling out the pin 230 and the pin 218 so as to uncouple the devices. Likewise it will be apparent that whenever the quick connecting conduit is opened, the valve 268 will close and prevent leakage in the line 256.

The present invention is made still more variable by inserting threaded extensions of varying length attachable at the lower end to the top end of the inner cylinder 20, and threadedly received by flared cap 84 at the base of valve control chest 18.

For purposes of exemplification a particular embodiment of the invention has been shown and described according to the best present understanding thereof. However, it will be apparent to those skilled in the art that various changes and modifications may be made therein without departing from the true spirit and scope of the invention.

What is claimed as new is as follows:

1. An automatic jack leg comprising a cylinder, a piston slidable in said cylinder, a fluid connection to said cylinder, a pressure responsive valve in said fluid connection, said valve including a valve sleeve, a valve rod slidable in said sleeve, said sleeve and said valve rod having cooperating ports therein, said rod being slidable to move said ports into and out of register and a tool supporting cradle supported by said valve rod, the weight of said cradle determining partly the longitudinal movement and position of the valve rod.

2. An automatic jack leg comprising a cylinder, a piston slidable in said cylinder, a fluid connection to said cylinder, a valve in said fluid connection, said valve including a valve sleeve and a valve rod slidable in said sleeve, said sleeve and said valve rod having cooperating ports therein, said rod being slidable to move said ports into partial or full register and out of register, said valve rod being manually rotatable to control the extent of registry of said ports, said valve rod being exposed to the fluid pressure in the cylinder, and a tool carrying cradle supported by said valve rod, the weight of said cradle determining partly the longitudinal movement and position of the valve rod.

3. An automatic jack leg comprising a cylinder, a piston slidable in said cylinder, a fluid connection to said cylinder, a valve in said fluid connection, said valve including a valve sleeve and a valve rod slidable in said sleeve, said valve rod being exposed to the fluid in the cylinder, said sleeve and said valve rod having cooperating ports therein, said valve rod being slidable to move said ports into partial or full register and out of register and said valve rod being further manually rotatable to control the extent of registry of said ports, an exhaust port in said sleeve, said valve rod being further rotatable to move the port in said rod into registry with said exhaust port, and a tool supporting cradle, supported by said valve rod, said cradle partly controlling the sliding movement of said valve rod.

4. A jack leg comprising an outer cylinder, an intermediate cylinder slidably received in sealing engagement with said outer cylinder, a stop inhibiting disengagement of said outer and intermediate cylinders, an inner cylinder slidable in said intermediate cylinder, a cylinder head closing one end at said outer cylinder, a closure applied to the opposite end of said inner cylinder, a fluid supply conduit, a valve selectively communicating said conduit with said cylinders, said valve including a valve rod, controlling the passage of fluid by its longitudinal displacement, and a tool supporting cradle supported by said valve rod and partly controlling its longitudinal displacement.

5. An automatic jack leg comprising a plurality of telescoping cylinders supporting a cradle for mounting a tool, stop means inhibiting separation of said cylinders, a head sealing one end of the outer cylinder, a valve chest secured to the opposite end of the inner cylinder, a closure plate secured in sealing relation between said valve chest and said inner cylinder, said closure plate having an aperture therein, a cylindrical valve body with a central longitudinal bore therein, a valve sleeve extending through said longitudinal bore and said aperture, said cylindrical body having inlet and outlet passages therein, a fluid conduit communicating with said inlet passage, said valve sleeve having a port communicating with said inlet passage and a port communicating with said outlet passage, a valve rod rotatably and slidably received in said sleeve, said valve rod having a bore communicating with the interior of said cylinders leading to a lateral opening, means operable to rotate said valve rod manually to selectively position said lateral opening with respect to the ports in said sleeve, said valve rod being moved longitudinally by the weight of the cradle and the tool supported thereby and by the fluid pressure in the telescoping cylinders.

6. An automatic jack leg comprising a plurality of telescoping cylinders, stop means inhibiting separation of said cylinders, a head sealing one end of the outer cylinder, a valve chest secured to the opposite end of the inner cylinder, a closure plate secured in sealing relation between said valve chest and said inner cylinder, said closure plate having an aperture therein, a valve body having a bore therein, a valve sleeve extending through said bore and said aperture, said body having inlet and outlet passages therein, a fluid conduit communicated with said inlet passage, said valve sleeve having a port communicating with said inlet passage and a port communicating with said outlet passage, a valve rod rotatably and slidably received in said sleeve, said valve rod having a bore communicating with said cylinders and a lateral opening, means operable to rotate said valve rod to selectively position said lateral opening with respect to the ports in said sleeve, a weight receiving member mounted on said valve rod and biasing said internal opening into register with said ports and counter biasing springs urging said lateral opening out of register with said ports.

7. An automatic jack leg comprising a plurality of telescoping cylinders, stop means inhibiting separation of said cylinders, a head sealing one end of the outer cylinder, a valve chest secured to the opposite end of the inner cylinder, a closure plate secured in sealing relation between said valve chest and said inner cylinder, said closure plate having an aperture therein, a valve body having a bore therein, a valve sleeve extending through said bore and said aperture, said body having inlet and outlet passages therein, a fluid conduit communicated with said inlet passage, said sleeve having a port communicating with said inlet passage and a port communicating with said outlet passage, a valve rod rotatably and slidably received in said sleeve, said valve rod having a bore communicating with said cylinders and a lateral opening, means operable to rotate said valve rod to selectively position said lateral opening with respect to the ports in said sleeve, resilient means biasing said valve rod longitudinally in said sleeve to vary the alignment of said lateral opening with said ports, a weight supporting member detachably secured to said valve rod, the weight mounted on said member urging said valve rod into alignment with said ports, stop means limiting the extent of sliding movement of said valve rod.

8. An automatic jack leg comprising a plurality of telescoping cylinders, stop means inhibiting separation of said cylinders, a head sealing one end of the outer cylinder, a valve chest secured to the opposite end of the inner cylinder, a closure plate secured in sealing relation between said valve chest and said inner cylinder, said closure plate having an aperture therein, a valve body having a bore therein, a valve sleeve extending through said bore and said aperture, said body having inlet and outlet passages therein, a fluid conduit communicated with said inlet passage, said sleeve having a port communicating with said inlet passage and a port communicating with said outlet passage, a valve rod rotatably and slidably received in said sleeve, said valve rod having a bore communicating with said cylinders and a lateral opening, means operable to rotate said valve rod to selectively position said lateral opening with respect to the ports in said sleeve, resilient means biasing said valve rod longitudinally in said sleeve to vary the alignment of said lateral opening with said ports, a longitudinal guide mounted on said valve chest, a sleeve slidable in said guide, a cross head in said sleeve, an adjustable pin extending between said valve rod and said cross head, resilient means urging said sleeve to extended position.

9. An automatic jack leg comprising a plurality of telescoping cylinders, stop means inhibiting separation of said cylinders, a head sealing one end of the outer cylinder, a valve chest secured to the opposite end of the inner cylinder, a closure plate secured in sealing relation between said valve chest and said inner cylinder, said closure plate having an aperture therein, a valve body having a bore therein, a valve sleeve extending through said bore and said aperture, said body having inlet and outlet passages therein, a fluid conduit communicated with said inlet passage, said sleeve having a port communicating with said inlet passage and a port communicating with said outlet passage, a valve rod rotatably and slidably received in said sleeve, said valve rod having a bore communicating with said cylinders and a lateral opening, means operable to rotate said valve rod to selectively position said lateral opening with respect to the ports in said sleeve, resilient means biasing said valve rod longitudinally in said sleeve to vary the alignment of said lateral opening with said ports, a longitudinal guide mounted on said valve chest, a sleeve slidable in said guide, a cross head in said sleeve, an adjustable pin extending between said valve rod and said cross head, resilient means urging said sleeve to extended position, a transverse bearing mounted on said sleeve, a cradle, ears on said cradle spaced to receive said bearing, said ears having bearing apertures therein, a bearing pin adapted to extend through said bearing and said bearing apertures, means operable to retain said bearing pin in said bearing.

References Cited in the file of this patent

UNITED STATES PATENTS

| | | |
|---|---|---|
| 1,357,294 | McKee | Nov. 2, 1920 |
| 2,241,794 | Stull | May 13, 1941 |
| 2,337,573 | Schultz | Dec. 28, 1943 |
| 2,341,463 | Maytham | Feb. 8, 1944 |
| 2,474,464 | Cable | June 28, 1949 |
| 2,638,075 | Towler | May 12, 1953 |

FOREIGN PATENTS

| | | |
|---|---|---|
| 453,560 | Great Britain | Sept. 14, 1936 |
| 636,568 | Great Britain | May 3, 1950 |
| 432,960 | Italy | Apr. 1, 1948 |

UNITED STATES PATENT OFFICE
CERTIFICATION OF CORRECTION

Patent No. 2,830,563                          April 15, 1958

Burton B. Burckhalter

It is hereby certified that error appears in the above numbered patent requiring correction and that the said Letters Patent should read as corrected below.

In the heading to the drawings, Sheets 1 to 3, line 2, and in the heading to the printed specification, line 2, title of invention, for "AUTOMATIC JACK LEG", each occurrence, read -- AUTOMATIC JACK SUPPORT --; column 1, lines 15, 23, 31, 40, 41, and 42, 45, 46 and 47, 56, 61 and 62, column 2, lines 22, 27, column 3, line 59, column 4, line 67, column 5, lines 35, 59, 69, column 6, lines 7, 22, 34, and 57, column 7, lines 4 and 28, and column 8, line 4, for "jack leg", each occurrence, read -- jack support --.

Signed and sealed this 25th day of April 1961.

(SEAL)
Attest:

ERNEST W. SWIDER                          DAVID L. LADD
Attesting Officer                            Commissioner of Patents